(12) United States Patent
Vuillemin et al.

(10) Patent No.: US 11,914,794 B2
(45) Date of Patent: *Feb. 27, 2024

(54) KEYBOARD WITH SURFACE LIGHTING APPARATUS

(71) Applicant: Logitech Europe S.A., Lausanne (CH)

(72) Inventors: Anthony Vuillemin, Hsinchu (TW);
Ming-Hsiang Weng, Tainan (TW);
Feng-Hao Lin, Emeryville, CA (US);
Sebastien Gadelle, Taipei (TW)

(73) Assignee: Logitech Europe S.A., Lausanne (CH)

( * ) Notice: Subject to any disclaimer, the term of this patent is extended or adjusted under 35 U.S.C. 154(b) by 0 days.

This patent is subject to a terminal disclaimer.

(21) Appl. No.: 17/956,539

(22) Filed: Sep. 29, 2022

(65) Prior Publication Data

US 2023/0093413 A1    Mar. 23, 2023

Related U.S. Application Data

(63) Continuation of application No. 17/481,148, filed on Sep. 21, 2021, now Pat. No. 11,474,616.

(51) Int. Cl.
*G06F 3/02* (2006.01)

(52) U.S. Cl.
CPC .................................. *G06F 3/0202* (2013.01)

(58) Field of Classification Search
CPC ................................................... G06F 3/0202
See application file for complete search history.

(56) References Cited

U.S. PATENT DOCUMENTS

| | | | | |
|---|---|---|---|---|
| 6,215,420 | B1 * | 4/2001 | Harrison | H01H 13/70 341/20 |
| 11,474,616 | B1 * | 10/2022 | Vuillemin | G06F 3/0202 |
| 2005/0226669 | A1 * | 10/2005 | Cheng | H01H 13/705 400/490 |
| 2011/0279377 | A1 * | 11/2011 | Tsai | G06F 3/0202 345/170 |
| 2016/0103503 | A1 * | 4/2016 | Pham | G06F 3/0208 345/170 |
| 2020/0269134 | A1 * | 8/2020 | Han | A63F 13/424 |
| 2020/0328050 | A1 * | 10/2020 | Files | G06F 1/1662 |
| 2022/0037101 | A1 * | 2/2022 | Brocklesby | H01H 13/704 |

\* cited by examiner

*Primary Examiner* — Amit Chatly
(74) *Attorney, Agent, or Firm* — Kilpatrick Townsend & Stockton LLP

(57) ABSTRACT

A keyboard comprising a top case and a bottom case comprised of a transparent material and including: a plurality of recesses each configured to receive one of a plurality of light emitting diodes (LED); a plurality of cavities that extend linearly and radially from a middle portion of the bottom case toward an outer edge of the keyboard, where light emitted by the LEDs is directed radially towards and out of the outer edge of the keyboard, due in part to the emission pattern of the corresponding LED and by adjacent cavities of the plurality of cavities; and a plurality of screw bosses configured to receive screws that securedly couple the top case to the bottom case, wherein the bottom case is coupled to the top case forming an outer housing for the keyboard.

15 Claims, 9 Drawing Sheets

KEYBOARD WITH SURFACE LIGHTING APPARATUS

CROSS REFERENCE PARAGRAPH FOR PRIORITY

This application is continuation of U.S. Non-Provisional application Ser. No. 17/481,148, filed Sep. 21, 2021, and titled "KEYBOARD WITH SURFACE LIGHTING APPARATUS," which is hereby incorporated by reference in its entirety for all purposes.

BACKGROUND

Keyboards have been and continue to be a ubiquitous human interface device for many user operated computing devices, including personal computers, smart devices, and the like, and have uses in consumer, commercial, and industrial applications the world over. There has been substantial innovation in all aspects of keyboards, with improvements in key structures, functionality, performance, ergonomics, reliability, aesthetics, and more.

In the gaming industry, many gaming keyboards employ lighting schemes that not only illuminate key tops and corresponding indicia, but also illuminate aspects of the keyboard itself. Some designs incorporate backlighting under or within the key structures that can illuminate the keyboard in a wide variety of colors and illumination patterns. However, the lighting infrastructure typically used by contemporary gaming keyboards can materially increase power consumption of the keyboard and create manufacturing tradeoffs including increasing keyboard size to accommodate the lighting infrastructure and cost. Thus, gaming keyboards with contemporary lighting capabilities are often bulky and are typically corded devices to provide adequate power and avoid substantially reduced battery life due to lighting power requirements.

BRIEF SUMMARY

In some embodiments, a keyboard comprises a top case including a plurality of holes, a plurality of key structures wherein each of the plurality of key structures is configured within a corresponding one of the plurality of holes of the top case, and a bottom case comprised of a transparent material (e.g., transparent thermoplastic polymer). The bottom case can include a plurality of recesses each configured to receive one of a plurality of light emitting diodes (LED) and a plurality of cavities that extend from a top of the bottom case to a bottom of the bottom case and extend linearly and radially from a middle portion of the bottom case toward an outer edge of the keyboard. Each of the plurality of LEDs (e.g., side-firing LEDs with 120 degree emission) can be configured to emit light into the bottom case, which operates as a light guide, where the emitted light is directed radially towards and out of the outer edge of the bottom case, due in part to an emission pattern of the corresponding LED and by adjacent cavities of the plurality of cavities. The bottom case can further include a plurality of screw bosses configured to receive screws that securely couple the top case to the bottom case, wherein the bottom case is coupled to the top case forming an outer housing for the keyboard that encapsulates at least a portion of the plurality of key structures. In some embodiments, the bottom case can be further comprised of 0.025% SiO2. An outer edge of the bottom case may be contoured such that the emitted light is directed out of the bottom case and, when the keyboard is placed on an underlying surface, downward toward the underlying surface that the keyboard is placed upon and creates a surface illumination effect. The plurality of cavities can operate to redirect reflected light radially towards and out of the outer edge of the keyboard, and to increase LED light mixing and uniformity. In certain embodiments, a top or bottom of the bottom case includes a reflective layer that operates to reflect incident light from the plurality of LEDs. The bottom case may further house an energy storage device configured to power the keyboard. The keyboard can further include a first printed circuit board (PCB) electrically coupled to the plurality of key structures and configured to provide structural support for the plurality of key structures, wherein the first PCB is coupled to one or more of the screw bosses of the bottom case, and a set of second PCBs electrically coupled to the plurality of LEDs and configured to provide structural support for the plurality of LEDs, wherein the set of second PCBs are coupled to one or more of the screw bosses of the bottom case.

In certain embodiments, a computer peripheral device comprises a top case and a bottom case comprised of a transparent material. The bottom case can include a plurality of recesses each configured to receive one of a plurality of light emitting diodes (e.g., side-firing LED), wherein each of the plurality of LEDs is configured to emit light into the bottom case, which operates as a light guide, where the emitted light is directed radially towards and out of an outer edge of the bottom case, due in part to an emission pattern of the corresponding LED, and a plurality of screw bosses configured to receive screws that securely couple the top case to the bottom case, wherein the bottom case is coupled to the top case forming an outer housing for the computer peripheral device. In some embodiments, an outer edge of the bottom case is contoured such that the emitted light is directed out of the bottom case and, when the computer peripheral device is placed on an underlying surface, downward toward the underlying surface that the computer peripheral device is placed upon and creates a surface illumination effect. The top or bottom of the bottom case can include a reflective layer that operates to reflect incident light from the plurality of LEDs. The keyboard can further include one or more PCBs electrically coupled to the plurality of LEDs and configured to provide structural support for the plurality of LEDs, wherein the one or more PCBs are coupled to one or more of the screw bosses of the bottom case.

In further embodiments, an apparatus comprises a bottom case for a keyboard comprised of a transparent material (e.g., thermoplastic polymer) and including a plurality of recesses each configured to receive one of a plurality of light emitting diodes (e.g., side-firing LEDs), a plurality of cavities that extend from a top of the bottom case to a bottom of the bottom case and extend linearly and radially from a middle portion of the bottom case toward an outer edge of the keyboard, wherein each of the plurality of LEDs is configured to emit light into the bottom case, which operates as a light guide, where the emitted light is directed radially towards and out of the outer edge of the bottom case, due in part to an emission pattern of the corresponding LED and by adjacent cavities of the plurality of cavities, and a plurality of screw bosses configured to receive screws that securely couple a top case of the keyboard to the bottom case, wherein the bottom case is configured to be coupled to the top case of the keyboard forming an outer housing for the keyboard. The bottom case can be further comprised of 0.025% SiO2. In some cases, an outer edge of the bottom case is contoured such that the emitted light is directed out of the bottom case and, when the keyboard is placed on an underlying surface, downward toward the underlying surface that the keyboard is placed upon and creates a surface illumination effect.

This summary is not intended to identify key or essential features of the claimed subject matter, nor is it intended to be used in isolation to determine the scope of the claimed subject matter. The subject matter should be understood by reference to appropriate portions of the entire specification of this disclosure, any or all drawings, and each claim.

The foregoing, together with other features and examples, will be described in more detail below in the following specification, claims, and accompanying drawings.

BRIEF DESCRIPTION OF THE DRAWINGS

The features of the various embodiments described above, as well as other features and advantages of certain embodiments of the present invention, will be more apparent from the following detailed description taken in conjunction with the accompanying drawings, in which.

Throughout the drawings, it should be noted that like reference numbers are typically used to depict the same or similar elements, features, and structures.

DETAILED DESCRIPTION

Figure 1:
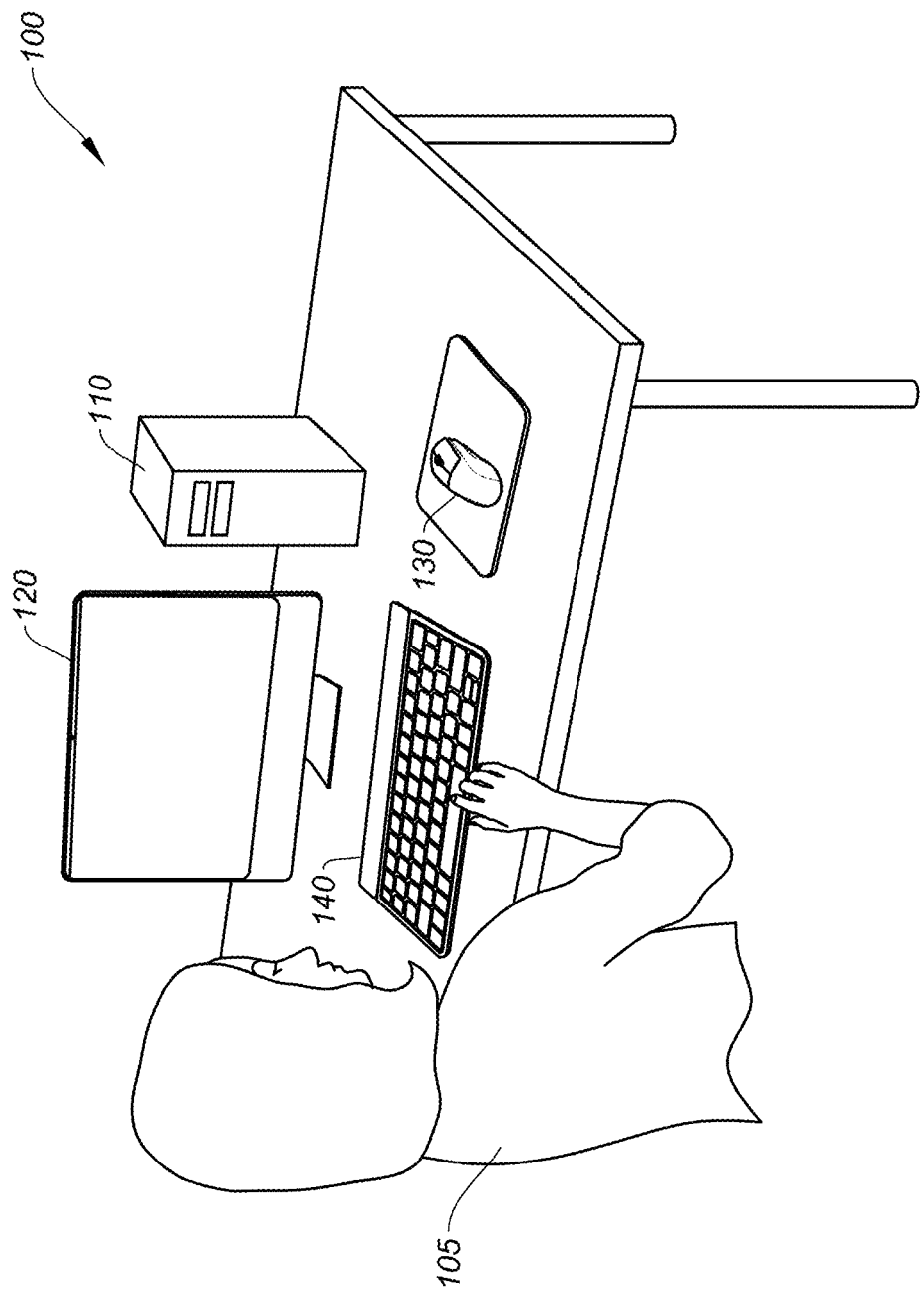
FIG. 1 shows an example of a computer system that can include any of a variety of host computing devices and computer peripheral devices, including computer peripheral devices that can be configured to perform aspects of the various inventive concepts described herein.

Aspects of the present disclosure relate generally to computer input devices, and more particularly to lighting systems thereof, according to certain embodiments.

In the following description, various examples of a surface lighting apparatus for an input device are described. For purposes of explanation, specific configurations and details are set forth in order to provide a thorough understanding of the embodiments. However, it will be apparent to one skilled in the art that certain embodiments may be practiced or implemented without every detail disclosed. Furthermore, well-known features may be omitted or simplified in order to prevent any obfuscation of the novel features described herein.

The following high level summary is intended to provide a basic understanding of some of the novel innovations depicted in the figures and presented in the corresponding descriptions provided below. Aspects of the invention relate to a lighting apparatus for an input device. The embodiments depicted herein relate to a keyboard device; however, the concepts presented herein can apply broadly to any suitable input device.

Many contemporary gaming input devices, such as keyboards and mice, often implement eye-catching lighting systems that may illuminate the key top indicia, the areas between the keys, and in some cases may cast light out of the sides of the keyboard. As noted above, the additional circuitry and infrastructure may have manufacturing consequences including higher cost and greater internal volume to fit the additional lighting hardware. Furthermore, unlike trigger events caused by key presses, which typically consume very little power, lighting systems may consume comparatively large amounts of power, making wireless battery-operated keyboards and mice impractical due to the substantially reduced battery life per charge on such devices. Aspects of the invention solve this technical problem with a solution that integrates a lighting apparatus with existing infrastructure (e.g., a bottom case) to substantially reduce any amount of additional internal space needed to accommodate the lighting infrastructure. Additionally, embodiments of the invention use modified existing infrastructure to operate as an efficient light guide to guide light from internal lighting elements (e.g., light emitting diodes—"LEDs") to the edges of the keyboard to provide side lighting, surface lighting, or the like, with excellent lighting characteristics and reduced power requirements. Although the many embodiments presented herein focus on keyboard-type embodiments, it should be understood that the novel concepts may be applied to any suitable input device including non-computer keyboards, computer mice, remote controls, gaming controls, or any other device that can utilize lighting elements.

In a typical keyboard, a bottom case typically couples with a top case to form an enclosure (e.g., housing) that encapsulates the contents of the keyboard, including partially encapsulating the key structures although typically no the key caps and portions of the key structure that project from the top of the top case for user access, as would be appreciated by one of ordinary skill in the art. In certain embodiments, the bottom case is adapted to include conventional features, such as screw bosses, to enable the top case to couple to the bottom case, as well as secure internal features to the bottom case including various printed circuit boards (PCBs), harnesses, charge storage device(s) (e.g., battery), or the like, and is also comprised on a transparent thermoplastic polymer that allows light to pass through it. The bottom case further includes a number of recesses to receive LEDs that direct light laterally and radially towards an outer side edge of the keyboard. The bottom case can further include linear, radially configured cuts or cavities that define a path for the light to traverse within the bottom case and operate to reflect some or all of the light that strikes the cavity back in to the lateral path toward the side edge of the keyboard, as shown and discussed in greater detail at least with respect to FIGS. 4-9B. Thus, the bottom case can provide structural integrity, mounting bosses, and regions to house or secure features like batteries, harnesses, etc., and can further be configured to operate as a light guide that directs light from embedded LEDs out laterally to emit light from the sides of the keyboard that can be used to illuminate an underlying surface and provide various lighting functions and effects with good efficiency and luminosity, without materially adding to the size and/or height of the keyboard for sleek, low-profile embodiments.

It is to be understood that this high level summary is presented to provide the reader with a baseline understanding of some of the novel aspects of the present disclosure and a roadmap to the details that follow. This high level summary in no way limits the scope of the various embodiments described throughout the detailed description and each of the figures referenced above are further described below in greater detail and in their proper scope.

FIG. 1 shows an example of a computer system 100 that can include any of a variety of host computing devices and computer peripheral devices, including computer peripheral devices (e.g., a computer mouse, keyboard, etc.) that can be configured to perform aspects of the various inventive concepts described herein. Computer system 100 shows a user 105 operating a host computing device (shown as a desktop computer) 110 and a number of computer peripheral devices communicatively coupled to and integrated with the host computing device, including a display device 120, a computer mouse 130, and a keyboard 140, and may include any other suitable input devices (e.g., speakers, printer, headset, Wi-Fi hub, etc.). Each computer peripheral device 120-140 can be communicatively coupled to host computing device 110.

Although the host computing device is shown as a desktop computer, other types of host computing devices can be used including gaming systems, laptop computers, set top boxes, entertainment systems, tablet or "phablet" computers, stand-alone head mounted displays ("HMD"), or any other suitable host computing device (e.g., smart phone, smart wearable, or the like). In some cases, multiple host computing devices may be used and one or more of the computer peripheral devices may be communicatively coupled to one, some, or all of the host computing devices (e.g., a computer keyboard may be coupled to multiple host computing devices and may switch between them using Flow™ technology from Logitech®). A host computing device may also be referred to herein as a "host computer," "host device," "computing device," "computer," or the like, and may include a machine-readable medium (not shown) configured to store computer code, such as driver software, firmware, and the like, where the computer code may be executable by one or more processors of the host computing device(s) to control aspects of the host computing device, for instance via the one or more computer peripheral devices.

A typical computer peripheral device can include any suitable input device, output device or input/output device including those shown (e.g., a keyboard) and not shown (e.g., remote control, wearables (e.g., gloves, watch, head mounted display), AR/VR controller, CAD controller, joystick, simulation shifter, stylus device, or other suitable device) that can be used, for example, to convert analog inputs into digital signals for computer processing. By way of example, a keyboard may be configured to provide control signals including button click events (e.g., corresponding to a pressing of one or more keys on the keyboard), audio signals (e.g., audio cues, integrated speakers), visual output signals (e.g., controlling one or more LEDs on the keyboard—controlled by the keyboard, the host computing devices coupled thereto, or a combination thereof), or the like. In another example, a computer peripheral device (e.g., computer mouse 130) can be configured to provide control signals for movement tracking (e.g., x-y movement on a planar surface, three-dimensional "in-air" movements, etc.), touch and/or gesture detection, lift detection, orientation detection (e.g., in 3 degrees-of-freedom (DOF) system, 6 DOF systems, etc.), power management capabilities, input detection (e.g., buttons, scroll wheels, etc.), output functions (e.g., LED control, haptic feedback, etc.), or any of myriad other features that can be provided by a computer peripheral device, as would be appreciated by one of ordinary skill in the art.

An input device may be a computer peripheral device, and may be referred to as either herein, as well as a "peripheral input device," "peripheral," or the like. In some cases, input devices may be referred to as human interface devices (HIDs) and their corresponding control signals may be referred to as HID commands. As noted above, the majority of the embodiments described herein generally refer to computer peripheral device 140; however, it should be understood that a computer peripheral device can be any suitable input/output (I/O) device (e.g., user interface device, control device, input unit, or the like) that may be adapted to utilize the novel embodiments described and contemplated herein.

Typical System Embodiment for Operating an Input Device

Figure 2:
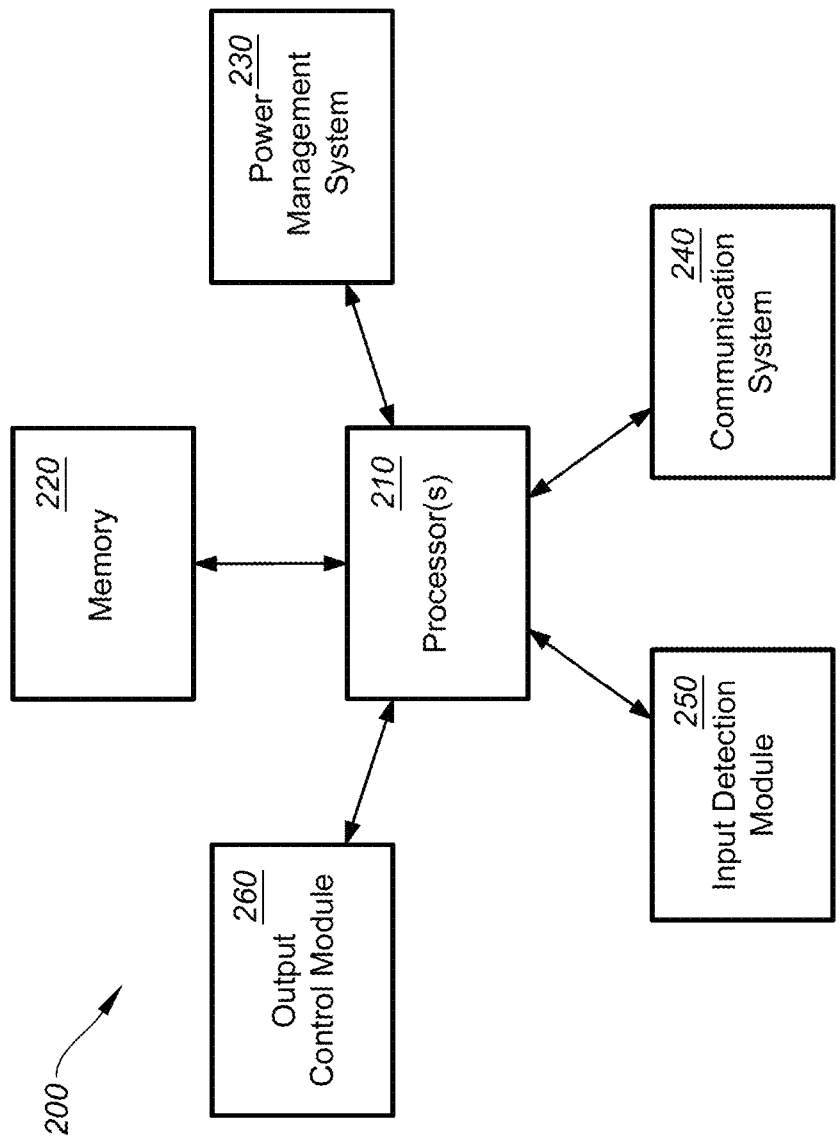
FIG. 2 shows a simplified block diagram of a system to operate an input device, according to certain embodiments.

FIG. 2 shows a system 200 for operating a computer peripheral device (e.g., computer mouse 130, keyboard 140, etc.), according to certain embodiments. System 200 may be configured to operate any of the computer peripheral devices specifically shown or not shown herein but within the wide purview of the present disclosure. System 200 may include processor(s) 210, memory 220, a power management system 230, a communication module 240, an input detection module 250, and an output control module 260. Each of the system blocks 220-260 can be in electronic communication with processor(s) 210 (e.g., via a bus system). System 200 may include additional functional blocks that are not shown or discussed to prevent obfuscation of the novel features described herein. System modules 220-260 (also referred to as "blocks") may be implemented as separate modules, or alternatively, more than one system block may be implemented in a single module. In the context described herein, system 200 can be incorporated into any input device described or mentioned herein and may be further configured with any of the novel embodiments described below (e.g., FIGS. 4-9), as would be appreciated by one of ordinary skill in the art with the benefit of this disclosure.

In certain embodiments, processor(s) 210 may include one or more microprocessors and can be configured to control the operation of system 200. Alternatively or additionally, processor(s) 210 may include one or more microcontrollers (MCUs), digital signal processors (DSPs), or the like, with supporting hardware and/or firmware (e.g., memory, programmable I/Os, etc.), and/or software, as would be appreciated by one of ordinary skill in the art. Processor(s) 210 can control some or all aspects of the operation of computer peripheral device 140 (e.g., system blocks 220-260). Alternatively or additionally, some of system blocks 220-260 may include an additional dedicated processor, which may work in conjunction with processor(s) 210. For instance, MCUs, μCs, DSPs, and the like, may be configured in other system blocks of system 200. Communications block 240 may include a local processor, for instance, to control aspects of communication with host computer 110 (e.g., via Bluetooth, Bluetooth LE, RF, IR, hardwire, ZigBee, Z-Wave, Logitech Unifying, or other communication protocol). Processor(s) 210 may be local to the peripheral device (e.g., contained therein), may be external to the peripheral device (e.g., off-board processing, such as by a corresponding host computing device), or a combination thereof. Processor(s) 210 may perform any of the various functions and methods described and/or covered by this disclosure in conjunction with any other system blocks in system 200. In some implementations, processor 302 of FIG. 3 may work in conjunction with processor 210 to perform some or all of the various methods described throughout this disclosure. In some embodiments, multiple processors may enable increased performance characteristics in system 200 (e.g., speed and bandwidth); however, multiple processors are not required, nor necessarily germane to the novelty of the embodiments described herein. One of ordinary skill in the art would understand the many variations, modifications, and alternative embodiments that are possible.

Memory block ("memory") 220 can store one or more software programs to be executed by processors (e.g., in processor(s) 210). It should be understood that "software" can refer to sequences of instructions that, when executed by processing unit(s) (e.g., processors, processing devices, etc.), cause system 200 to perform certain operations of software programs. The instructions can be stored as firmware residing in read-only memory (ROM) and/or applications stored in media storage that can be read into memory for execution by processing devices (e.g., processor(s) 210). Software can be implemented as a single program or a collection of separate programs and can be stored in non-volatile storage and copied in whole or in-part to volatile working memory during program execution. In some embodiments, memory 220 may store data corresponding to inputs on the peripheral device, such as a detected movement of the peripheral device by a sensor (e.g., optical sensor, accelerometer, etc.), activation of one or more input elements (e.g., buttons, sliders, touch-sensitive regions, etc.), or the like. Stored data may be aggregated and sent via reports to a host computing device (e.g., HID data).

In certain embodiments, memory 220 can store the various data described throughout this disclosure. For example, memory 220 can store and/or include instructions configured to control lighting of a plurality of LEDs that illuminate the sides of the keyboard, the underlying surface, or other features of the keyboard including key cap lighting (e.g., illuminating indicia), ambient lighting between keys, or the like. Memory 220 can be used to store any suitable data to perform any function described herein and as would be appreciated by one of ordinary skill in the art with the benefit of this disclosure. Memory array 220 can be referred to as a storage system or storage subsystem, and can store one or more software programs to be executed by processors (e.g., in processor(s) 210). It should be understood that "software" can refer to sequences of instructions that, when executed by processing unit(s) (e.g., processors, processing devices, etc.), cause system 200 to perform certain operations of software programs. The instructions can be stored as firmware residing in read-only memory (ROM) and/or applications stored in media storage that can be read into memory for processing by processing devices. Software can be implemented as a single program or a collection of separate programs and can be stored in non-volatile storage and copied in whole or in-part to volatile working memory during program execution. From a storage subsystem, processing devices can retrieve program instructions to execute in order to execute various operations (e.g., LED lighting characteristics, functions, etc.) as described herein.

Power management system 230 can be configured to manage power distribution, recharging, power efficiency, and the like. In some embodiments, power management system 230 can include a battery (not shown), a Universal Serial Bus (USB)-based recharging system for the battery (see, e.g., FIG. 6), power management devices (e.g., voltage regulators—not shown), and a power grid within system 200 to provide power to each subsystem (e.g., communications block 240, etc.). In certain embodiments, the functions provided by power management system 230 may be incorporated into processor(s) 210. Alternatively, some embodiments may not include a dedicated power management block. For example, functional aspects of power management block 230 may be subsumed by another block (e.g., processor(s) 210) or in combination therewith. The power source can be a charge storage device(s) including replaceable batteries, rechargeable energy storage device(s) (e.g., super capacitor, Lithium Polymer Battery, NiMH, NiCd), or a corded power supply to receive power from an external power source (e.g., host computing device, other peripheral device, wall outlet, etc.). The recharging system can include an additional cable (specific for the recharging purpose) or it can use a USB connection to recharge the battery.

Communication system 240 (communication "block" 240) can be configured to enable wireless communication with a corresponding host computing device (e.g., 110), or other devices and/or peripherals, according to certain embodiments. Communication system 240 can be configured to provide radio-frequency (RF), Bluetooth®, Logitech proprietary communication protocol (e.g., Unifying, Gaming Lightspeed, or others), infra-red (IR), ZigBee®, Z-Wave, or other suitable communication technology to communicate with other computing devices and/or peripheral devices. System 200 may optionally comprise a hard-wired connection to the corresponding host computing device. For example, input device 130 can be configured to receive a USB, FireWire®, Thunderbolt®, or other universal-type cable to enable bi-directional electronic communication with the corresponding host computing device or other external devices. Some embodiments may utilize different types of cables or connection protocol standards to establish hardwired communication with other entities. In some cases, communication ports (e.g., USB), power ports, etc., may be considered as part of other blocks described herein (e.g., input detection module 250, output control module 260, etc.). In some aspects, communication system 240 can send reports generated by the processor(s) 210 (e.g., HID data, streaming or aggregated data, etc.) to a host computing device. In some embodiments, the reports can be generated by the processor(s) only, in conjunction with the processor(s), or other entity in system 200. Communication system 240 may incorporate one or more antennas, oscillators, etc., and may operate at any suitable frequency band (e.g., 2.4 GHz), etc. One of ordinary skill in the art with the benefit of this disclosure would appreciate the many modifications, variations, and alternative embodiments thereof.

Input detection module 250 can control the detection of a user-interaction with input elements (also referred to as "elements") on an input device. For instance, input detection module 250 can detect user inputs from motion sensors, keys or buttons (e.g., depressible elements), roller wheels, scroll wheels, track balls, touch pads (e.g., one and/or two-dimensional touch sensitive touch pads), click wheels, dials, keypads, microphones, GUIs, touch-sensitive GUIs, proximity sensors (e.g., IR, thermal, Hall effect, inductive sensing, etc.) image sensor based detection such as gesture detection (e.g., via webcam), audio based detection such as voice input (e.g., via microphone), or the like, as would be appreciated by one of ordinary skill in the art with the benefit of this disclosure. Alternatively, the functions of input detection module 250 can be subsumed by processor 210, or in combination therewith.

In some embodiments, input detection module 250 can detect a touch or touch gesture on one or more touch sensitive surfaces on input device 130. Input detection module 250 can include one or more touch sensitive surfaces or touch sensors. Touch sensors generally comprise sensing elements suitable to detect a signal such as direct contact, electromagnetic or electrostatic fields, or a beam of electromagnetic radiation. Touch sensors can typically detect changes in a received signal, the presence of a signal, or the absence of a signal. A touch sensor may include a source for emitting the detected signal, or the signal may be generated by a secondary source. Touch sensors may be configured to detect the presence of an object at a distance from a reference zone or point (e.g., <5 mm), contact with a reference zone or point, or a combination thereof. Certain embodiments of computer peripheral device 140 may or may not utilize touch detection or touch sensing capabilities.

Input detection module 250 can include touch and/or proximity sensing capabilities. Some examples of the types of touch/proximity sensors may include, but are not limited to, resistive sensors (e.g., standard air-gap 4-wire based, based on carbon loaded plastics which have different electrical characteristics depending on the pressure (FSR), interpolated FSR, strain gages, etc.), capacitive sensors (e.g., surface capacitance, self-capacitance, mutual capacitance, etc.), optical sensors (e.g., light barrier type (default open or closed), infrared light barriers matrix, laser based diode coupled with photo-detectors that could measure the time of flight of the light path, etc.), acoustic sensors (e.g., piezobuzzer coupled with microphones to detect the modification of a wave propagation pattern related to touch points, etc.), inductive sensors, magnetic sensors (e.g., Hall Effect, etc.), or the like.

Input detection module 250 may include a movement tracking sub-block that can be configured to detect a relative displacement (movement tracking) of the computer peripheral device 150. For example, input detection module 250 optical sensor(s) such as IR LEDs and an imaging array of photodiodes can be used to detect a movement of computer peripheral device 150 relative to an underlying surface. Computer peripheral device 130 may optionally include movement tracking hardware that utilizes coherent (laser) light. Moving tracking can provide positional data (e.g., delta X and delta Y data from last sampling) or lift detection data. For example, an optical sensor can detect when a user lifts computer peripheral device 130 off of an underlying surface (also referred to as a "work surface") and can send that data to processor 210 for further processing. In some embodiments, processor 210, the movement tracking block (which may include an additional dedicated processor), or a combination thereof, may perform movement tracking functions, as would be appreciated by one of ordinary skill in the art with the benefit of this disclosure.

In certain embodiments, accelerometers can be used for movement detection. Accelerometers can be electromechanical devices (e.g., micro-electromechanical systems (MEMS) devices) configured to measure acceleration forces (e.g., static and dynamic forces). One or more accelerometers can be used to detect three dimensional (3D) positioning. For example, 3D tracking can utilize a three-axis accelerometer or two two-axis accelerometers (e.g., in a "3D air mouse," HMD, or other device). Accelerometers can further determine if the input device 150 has been lifted off of an underlying surface and can provide movement data that may include the velocity, physical orientation, and acceleration of computer peripheral device 130. In some embodiments, gyroscope(s) can be used in lieu of or in conjunction with accelerometer(s) to determine movement or input device orientation.

In some embodiments, output control module 260 can control various outputs for a corresponding computer peripheral device. For instance, output control module 260 may control a number of visual output elements (e.g., LEDs, LCD screens), displays, audio outputs (e.g., speakers), haptic output systems, or the like. One of ordinary skill in the art with the benefit of this disclosure would appreciate the many modifications, variations, and alternative embodiments thereof.

Although certain systems may not be expressly discussed, they should be considered as part of system 200, as would be understood by one of ordinary skill in the art. For example, system 200 may include a bus system to transfer power and/or data to and from the different systems therein. It should be appreciated that system 200 is illustrative and that variations and modifications are possible. System 200 can have other capabilities not specifically described herein. Further, while system 200 is described with reference to particular blocks, it is to be understood that these blocks are defined for convenience of description and are not intended to imply a particular physical arrangement of component parts. Further, the blocks need not correspond to physically distinct components. Blocks can be configured to perform various operations, e.g., by programming a processor or providing appropriate control circuitry, and various blocks might or might not be reconfigurable depending on how the initial configuration is obtained.

Embodiments of the present invention can be realized in a variety of apparatuses including electronic devices (e.g., computer peripheral devices) implemented using any combination of circuitry and software. Furthermore, aspects and/or portions of system 200 may be combined with or operated by other sub-systems as required by design. For example, input detection module 250 and/or memory 220 may operate within processor(s) 210 instead of functioning as a separate entity. In addition, the inventive concepts described herein can also be applied to any electronic device. Further, system 200 can be applied to any of the computer peripheral devices described in the embodiments herein, whether explicitly, referentially, or tacitly described (e.g., would have been known to be applicable to a particular computer peripheral device by one of ordinary skill in the art). The foregoing embodiments are not intended to be limiting and those of ordinary skill in the art with the benefit of this disclosure would appreciate the myriad applications and possibilities.

System for Operating a Host Computing Device

Figure 3:
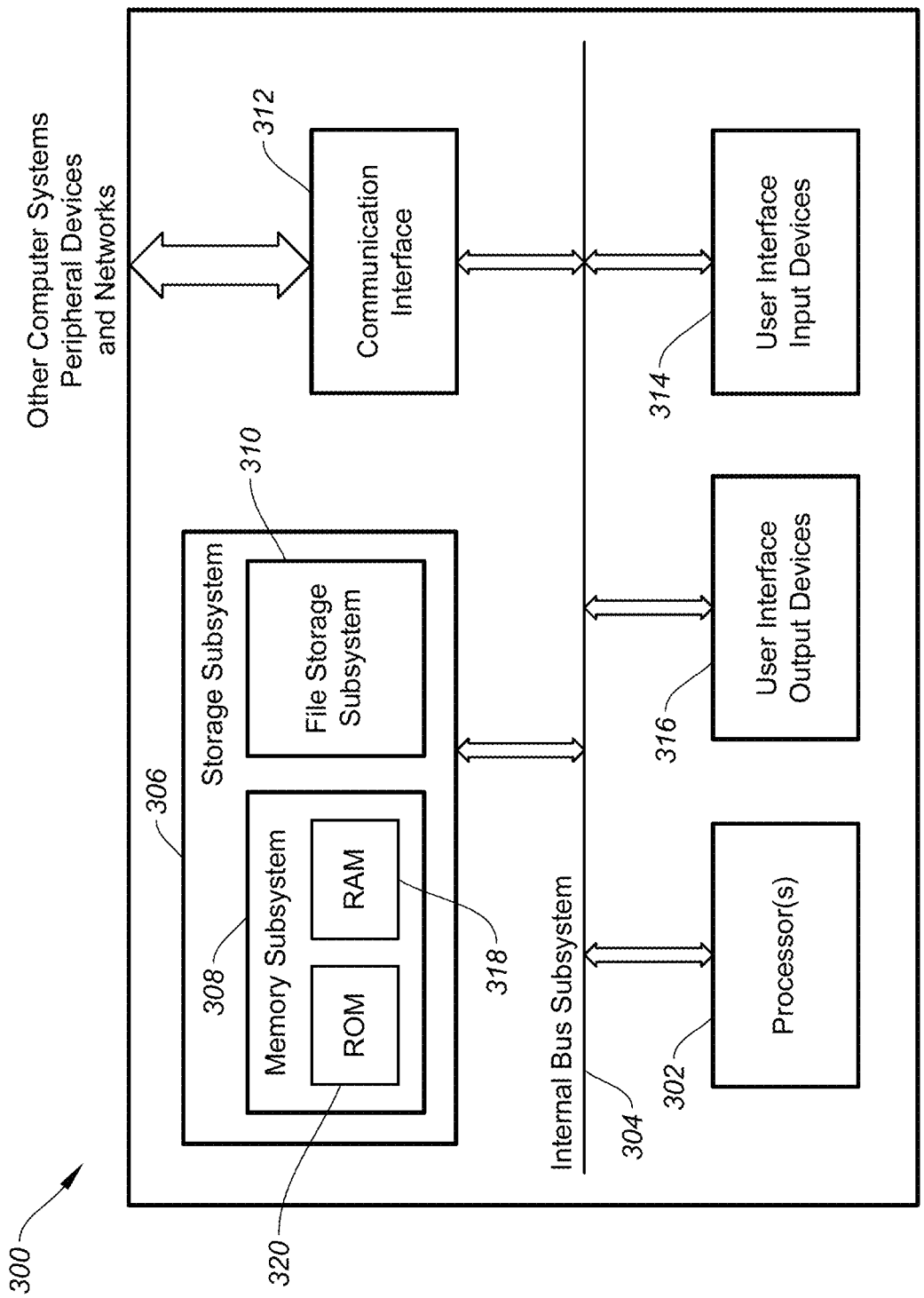
FIG. 3 is a simplified block diagram of a host computing device, according to certain embodiments.

FIG. 3 is a simplified block diagram of a computing device 300, according to certain embodiments. Computing device 300 can implement some or all functions, behaviors, and/or capabilities described above that would use electronic storage or processing, as well as other functions, behaviors, or capabilities not expressly described. Computing device 300 includes a processing subsystem (processor(s)) 302, a storage subsystem 306, user interfaces 314, 316, and a communication interface 312. Computing device 300 can also include other components (not explicitly shown) such as a battery, power controllers, and other components operable to provide various enhanced capabilities. In various embodiments, computing device 300 can be implemented in a host computing device, such as a desktop 110 or laptop computer, mobile device (e.g., tablet computer, smart phone, mobile phone), wearable device, media device, or the like, in peripheral devices (e.g., keyboards, etc.) in certain implementations. Computing device 300 can also be referred to as "computing system 300" or "system 300" throughout the present disclosure.

Processor(s) 302 can include MCU(s), micro-processors, application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, or electronic units designed to perform a function or combination of methods, functions, etc., described throughout this disclosure.

Storage subsystem 306 can be implemented using a local storage and/or removable storage medium, e.g., using disk, flash memory (e.g., secure digital card, universal serial bus flash drive), or any other non-transitory storage medium, or a combination of media, and can include volatile and/or non-volatile storage media. Local storage can include a memory subsystem 308 including random access memory (RAM) 318 such as dynamic RAM (DRAM), static RAM (SRAM), synchronous dynamic RAM (e.g., DDR), or battery backed-up RAM or read-only memory (ROM) 320, or a file storage subsystem 310 that may include one or more code modules. In some embodiments, storage subsystem 306 can store one or more applications and/or operating system programs to be executed by processing subsystem 302, including programs to implement some or all operations described above that would be performed using a computer. For example, storage subsystem 306 can store one or more code modules for implementing one or more method steps described herein.

A firmware and/or software implementation may be implemented with modules (e.g., procedures, functions, and so on). A machine-readable medium tangibly embodying instructions may be used in implementing methodologies described herein. Code modules (e.g., instructions stored in memory) may be implemented within a processor or external to the processor. As used herein, the term "memory" refers to a type of long term, short term, volatile, nonvolatile, or other storage medium and is not to be limited to any particular type of memory or number of memories or type of media upon which memory is stored.

The term "storage medium" or "storage device" may represent one or more memories for storing data, including read-only memory (ROM), RAM, magnetic RAM, core memory, magnetic disk storage mediums, optical storage mediums, flash memory devices and/or other machine-readable mediums for storing information. The term "machine-readable medium" includes, but is not limited to, portable or fixed storage devices, optical storage devices, wireless channels, and/or various other storage mediums capable of storing instruction(s) and/or data.

Furthermore, embodiments may be implemented by hardware, software, scripting languages, firmware, middleware, microcode, hardware description languages, and/or any combination thereof. When implemented in software, firmware, middleware, scripting language, and/or microcode, program code or code segments to perform tasks may be stored in a machine-readable medium such as a storage medium. A code segment (e.g., code module) or machine-executable instruction may represent a procedure, a function, a subprogram, a program, a routine, a subroutine, a module, a software package, a script, a class, or a combination of instructions, data structures, and/or program statements. A code segment may be coupled to another code segment or a hardware circuit by passing and/or receiving information, data, arguments, parameters, and/or memory contents. Information, arguments, parameters, data, etc. may be passed, forwarded, or transmitted by suitable means including memory sharing, message passing, token passing, network transmission, etc. These descriptions of software, firmware, storage mediums, etc., apply to systems 200 and 300, as well as any other implementations within the wide purview of the present disclosure. In some embodiments, aspects of the invention (e.g., surface classification) may be performed by software stored in storage subsystem 306, stored in memory 220 of input device 140, or both. One of ordinary skill in the art with the benefit of this disclosure would appreciate the many modifications, variations, and alternative embodiments thereof.

Implementation of the techniques, blocks, steps and means described throughout the present disclosure may be done in various ways. For example, these techniques, blocks, steps and means may be implemented in hardware, software, or a combination thereof. For a hardware implementation, the processing units may be implemented within one or more ASICs, DSPs, DSPDs, PLDs, FPGAs, processors, controllers, micro-controllers, microprocessors, other electronic units designed to perform the functions described above, and/or a combination thereof.

Each code module may comprise sets of instructions (codes) embodied on a computer-readable medium that direct a processor of a computing device 110 to perform corresponding actions. The instructions may be configured to run in sequential order, in parallel (such as under different processing threads), or in a combination thereof. After loading a code module on a general purpose computer system, the general purpose computer is transformed into a special purpose computer system.

Computer programs incorporating various features described herein (e.g., in one or more code modules) may be encoded and stored on various computer readable storage media. Computer readable media encoded with the program code may be packaged with a compatible electronic device, or the program code may be provided separately from electronic devices (e.g., via Internet download or as a separately packaged computer readable storage medium). Storage subsystem 306 can also store information useful for establishing network connections using the communication interface 312.

Computer system 300 may include user interface input devices 314 elements (e.g., touch pad, touch screen, scroll wheel, click wheel, dial, button, switch, keypad, microphone, etc.), as well as user interface output devices 316 (e.g., video screen, indicator lights, speakers, headphone jacks, virtual- or augmented-reality display, etc.), together with supporting electronics (e.g., digital to analog or analog to digital converters, signal processors, etc.). A user can operate input devices of user interface 314 to invoke the functionality of computing device 300 and can view and/or hear output from computing device 300 via output devices of user interface 316.

Processing subsystem 302 can be implemented as one or more processors (e.g., integrated circuits, one or more single core or multi core microprocessors, microcontrollers, central processing unit, graphics processing unit, etc.). In operation, processing subsystem 302 can control the operation of computing device 300. In some embodiments, processing subsystem 302 can execute a variety of programs in response to program code and can maintain multiple concurrently executing programs or processes. At a given time, some or all of a program code to be executed can reside in processing subsystem 302 and/or in storage media, such as storage subsystem 304. Through programming, processing subsystem 302 can provide various functionality for computing device 300. Processing subsystem 302 can also execute other programs to control other functions of computing device 300, including programs that may be stored in storage subsystem 304.

Communication interface (also referred to as network interface) 312 can provide voice and/or data communication capability for computing device 300. In some embodiments, communication interface 312 can include radio frequency (RF) transceiver components for accessing wireless data networks (e.g., Wi-Fi network; 3G, 4G/LTE; etc.), mobile communication technologies, components for short range wireless communication (e.g., using Bluetooth communication standards, NFC, etc.), other components, or combinations of technologies. In some embodiments, communication interface 312 can provide wired connectivity (e.g., universal serial bus (USB), Ethernet, universal asynchronous receiver/transmitter, etc.) in addition to, or in lieu of, a wireless interface. Communication interface 312 can be implemented using a combination of hardware (e.g., driver circuits, antennas, modulators/demodulators, encoders/decoders, and other analog and/or digital signal processing circuits) and software components. In some embodiments, communication interface 312 can support multiple communication channels concurrently.

User interface input devices 314 may include any suitable computer peripheral device (e.g., computer mouse 130, keyboard, gaming controller, remote control, stylus device, etc.), as would be appreciated by one of ordinary skill in the art with the benefit of this disclosure. User interface output devices 316 can include display devices (e.g., a monitor, television, projection device, etc.), audio devices (e.g., speakers, microphones), haptic devices, etc. Note that user interface input and output devices are shown to be a part of computing device 300 as an integrated system. In some cases, such as in laptop computers, this may be the case as keyboards and input elements as well as a display and output elements are integrated on the same host computing device. In some cases, the input and output devices may be separate from computing device 300, as shown in FIG. 1. One of ordinary skill in the art with the benefit of this disclosure would appreciate the many modifications, variations, and alternative embodiments thereof.

It will be appreciated that computing device 300 is illustrative and that variations and modifications are possible. A host computing device can have various functionality not specifically described (e.g., voice communication via cellular telephone networks) and can include components appropriate to such functionality. While the computing device 300 is described with reference to particular blocks, it is to be understood that these blocks are defined for convenience of description and are not intended to imply a particular physical arrangement of component parts. For example, processing subsystem 302, storage subsystem 306, user interfaces 314, 316, and communications interface 312 can be in one device or distributed among multiple devices. Further, the blocks need not correspond to physically distinct components. Blocks can be configured to perform various operations, e.g., by programming a processor or providing appropriate control circuitry, and various blocks might or might not be reconfigurable depending on how an initial configuration is obtained. Embodiments of the present invention can be realized in a variety of apparatus including electronic devices implemented using a combination of circuitry and software. Host computing devices or even peripheral devices described herein can be implemented using system 300.

Figure 4:
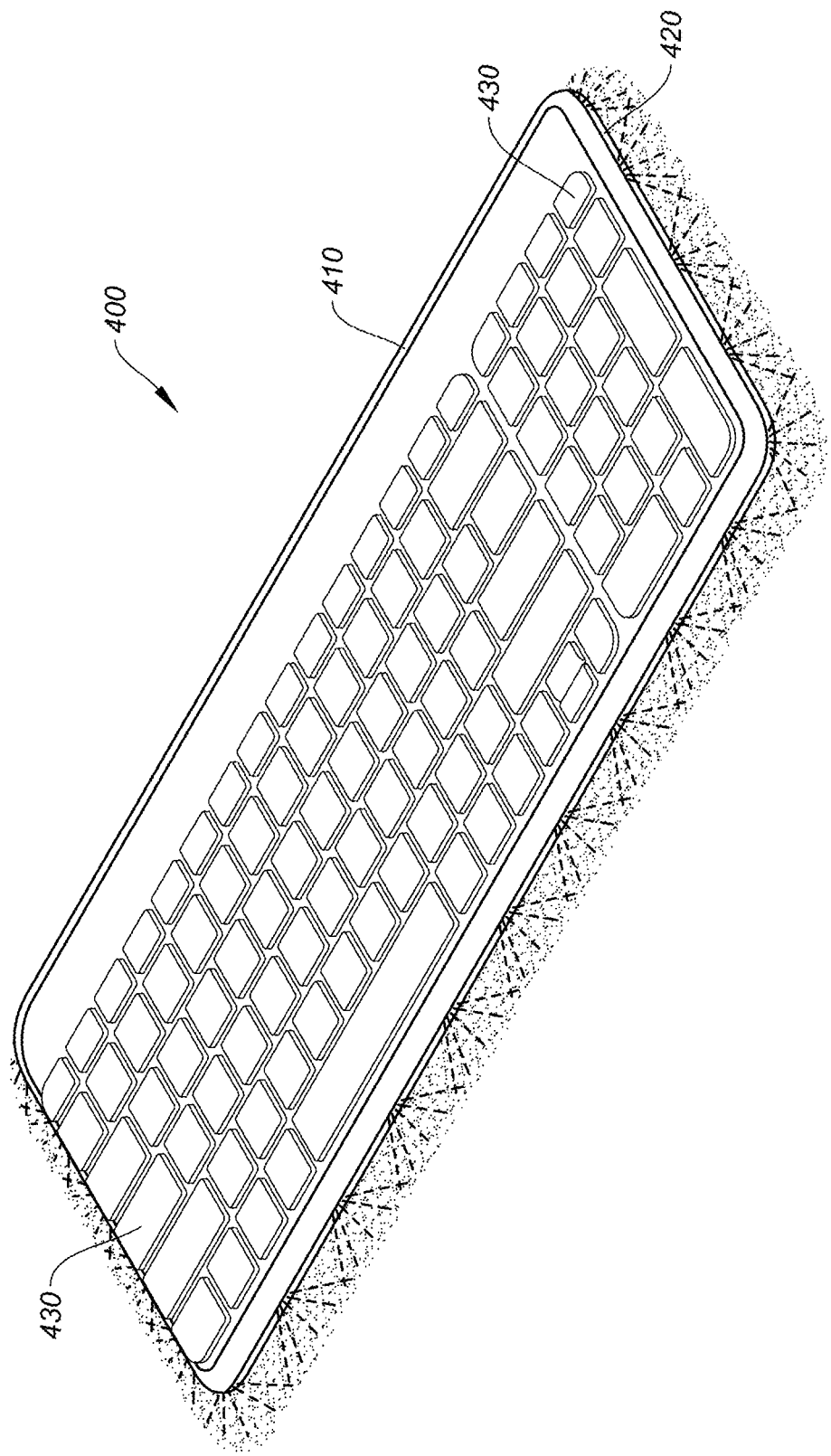
FIG. 4 shows a keyboard with a surface lighting system, according to certain embodiments.

FIG. 4 shows a keyboard 400 with a surface lighting system configured on an underlying surface, according to certain embodiments. Keyboard 400 includes a top case 410 and a bottom case 420 that are fixedly coupled together to form an outer housing for keyboard 400. Top case 410 can include a plurality of holes. Each of a plurality of key structures 420 can be configured within a corresponding hole of the plurality of holes in top case 410, as shown in FIG. 4. Bottom case 420 can include a plurality of screw bosses (as shown, e.g., in FIGS. 5-7) configured to receive screws that securedly (fixedly) couple the top case to the bottom case that form an outer housing for the keyboard that encapsulates at least a portion of the plurality of key structures (e.g., portions of the key structures and the key caps typically protrude from a top surface of top case 410). Keyboard 400 includes a lighting system that can emit light laterally out of the sides of the keyboard (e.g., left, right, front, back sides) using the novel lighting system further described below. The emitted light can be directed, totally or in part, towards the underlying surface, which may in some cases generate various surface illumination effects (e.g., make the keyboard appear that it is floating). In some cases, keyboard 400 may emit light only laterally (e.g., parallel to the underlying surface), downwards (e.g., towards the underlying surface), or a combination thereof. Keyboard 400 may be corded (e.g., powered via a USB port) or cordless (e.g., powered via a battery, renewable energy source, or other local charge storage or charge generation device(s)). Although keyboard 400 is shown using the novel lighting systems described herein, any suitable input device may be configured with said lighting systems, as noted above.

Figure 5:
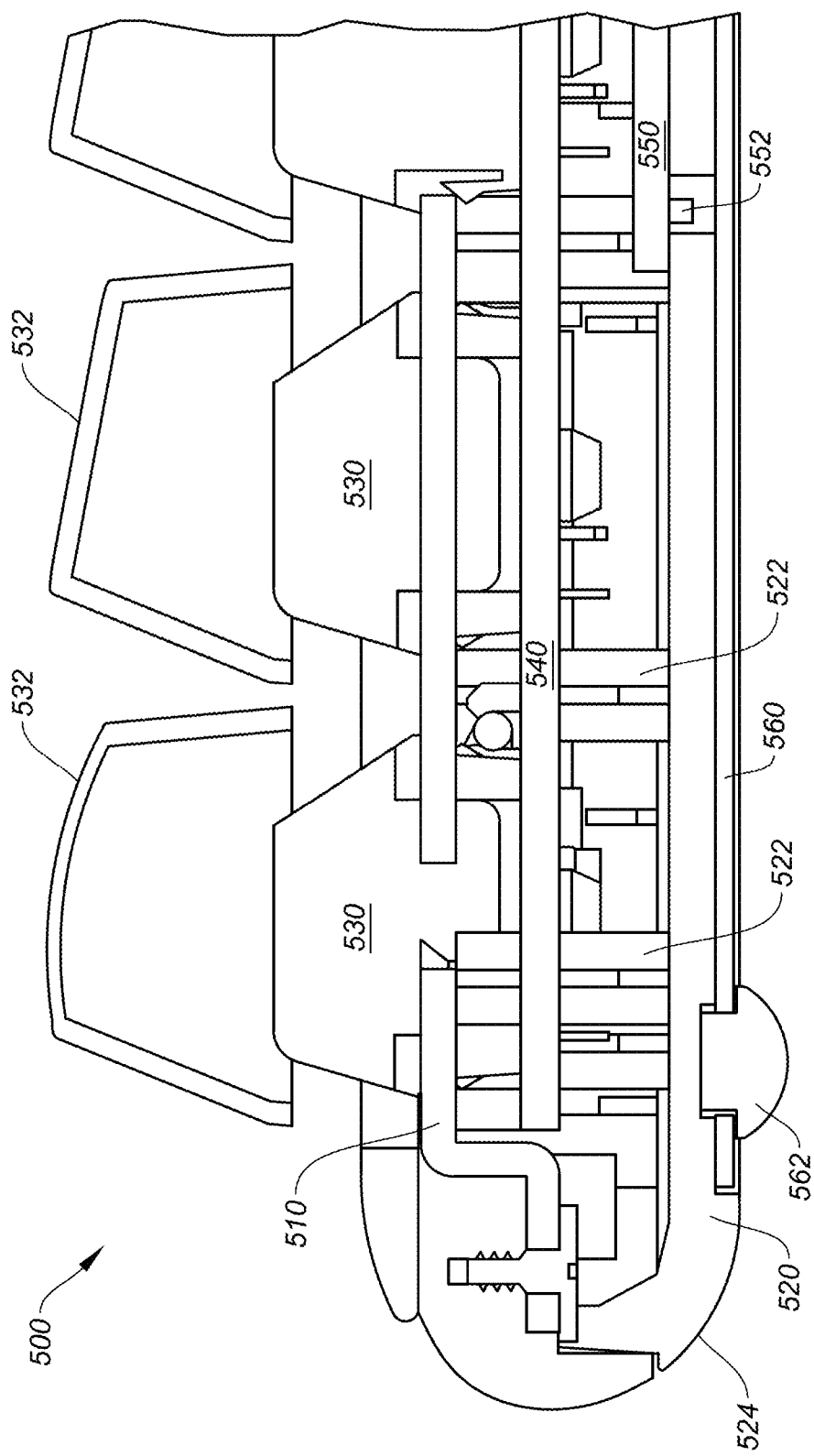
FIG. 5 shows a cross-sectional side-elevation view of a keyboard with a surface lighting system, according to certain embodiments.

FIG. 5 shows a cross-sectional side-elevation view of a keyboard 500 with a surface lighting system, according to certain embodiments. Keyboard 500 includes a top case 510 and bottom case 520. Top case 510 may include a plurality of holes and a plurality of key structures 530, wherein each of the plurality of key structures are configured within a corresponding one of the plurality of holes of the top case. Bottom case 520 is comprised of a transparent material, wholly or in part, and includes a plurality of screw bosses 522 configured to receive screws that securedly couple the top case to the bottom case (that is, the top case and bottom case are fixedly coupled together using hardware, such as screws, tabs, pins, adhesive, or other hardware or material, or a combination thereof, that securely couples the top case to the bottom case), forming an outer housing (the "housing") for the keyboard that encapsulates at least a portion of the plurality of key structures 530, as would be appreciated by one of ordinary skill in the art with the benefit of this disclosure. Typically, at least the keycaps 532 on each of the plurality of key structure 530 protrude from a top side of top case 510. Keyboard 510 may include one or more PCBs 540 that can be physically and electrically coupled to the plurality of key structures 530 to provide structural support to key structures 530 and to conduct and bus signals generated by the key structures (e.g., HID commands), such as signals generated during key press events when a key cap is depressed by a user, as would be appreciated by one of ordinary skill in the art with the benefit of this disclosure.

One or more LED PCBs 550 may include one or more LEDs 552 coupled thereto. Each LED 552 can be configured on a corresponding bottom side of an LED PCB 550 such that the light emitting portion extends downward. Bottom case 520 may include a plurality of recesses each configured to receive one of a plurality of light emitting diodes (LED) such that at least the light emitting portion of the LEDs 552 are configured within bottom case 520. LEDs 552 may be side-firing LEDs that emit light sideways (in a lateral direction) such that the emitted light propagates through transparent bottom case 520, which operates as a light guide, where the emitted light is directed radially towards and out of the outer edge of the keyboard at a contoured side portion of bottom case 520 that directs light towards an underlying surface of keyboard 500.

Bottom case 510 may include a plurality of cavities 628 (not shown in FIG. 5, but depicted at least in FIGS. 6-7) that extend from a top of the bottom case to a bottom of the bottom case and extend linearly and radially from a middle portion of the bottom case toward an outer edge of the keyboard, where each of the plurality of LEDs is configured to emit light into the bottom case, which operates as a light guide, where the emitted light is directed radially towards and out of the outer edge of the keyboard, due in part to the emission pattern of the corresponding LED (e.g., side-firing LEDs) and by the adjacent cavities of the plurality of cavities. For the sake of clarity, the cavities can be thought of metaphorically as gutters in a bowling alley with the rails (i.e., the barriers surrounding the lane and within the gutters that prevent the ball from entering the gutter), where light emitted from the LEDs travels radially outwards towards the edge of the keyboard though bottom case 520 and light rays that strike the cavities bounce back into the path towards the keyboard edge, as better shown in FIGS. 9A and 9B.

A bottom layer 560 may be coupled to bottom case 520 to provide, for instance, a reflective layer to keep LED light within bottom case 560 (e.g., via a Mylar® surface), or provide a surface to mount feet 562 or other support structures, or the like. The reflective surface can be applied to a top side and/or bottom side of the bottom case to control light leakage on the corresponding top/bottom sides and to allow light to bounce in-between within the bottom case, which can increase light transmission efficiency and can contribute to improved light uniformity and color mixing. In some embodiments, aspects of bottom layer 560 may be integrated with bottom case 520. For example, feet may be coupled directly to bottom case 520. In some cases, a reflective surface may be added to the top or bottom of bottom case 520 via mechanical, adhesive, or chemical connection. One of ordinary skill in the art with the benefit of this disclosure would appreciate the many modifications, variations, and alternative embodiments thereof.

In some embodiments, the outer edges of transparent bottom case 510 may be contoured to direct light downwards towards an underlying surface. The LEDs 552 may be configured farther back from the edge (e.g., >5 cm) to ensure good color mixing (e.g., red, green, blue) for multi-color LEDs, good light uniformity, but close enough (e.g., <15 cm) to maintain good lighting efficiency (e.g., an amount of LED light that is propagated out from the keyboard edge). In some embodiments, the number of LEDs may be used to define a number of lighting zones that are needed. A lighting zone may correspond to an area lighted by one LED (e.g., corresponding to surface effect 992). An emitting angle of an LED can be 120 degrees, although other emitting angles are possible. As shown in FIG. 9B, a distance D between the side of the bottom case and the LED position combined with the LED pitch can be used to define the width of the lighting zones. Cavities (described below) can also help define lighting zones. Typically, the shorter the distance, the shorter the lighting zone where the lighting efficiency is relatively high (e.g., more light from the LED is directed to the lighting zone), and the uniformity is relatively low. When the distance is longer, efficiency may be relatively low, but the uniformity may be relatively high. In some embodiments, the distance D may be 50 mm, which exhibits good uniformity and efficiency. Distances lower or substantially lower (e.g., <45 mm) than 50 mm typically have a deleterious effect on the uniformity, and distances higher than 75 mm tend to have a deleterious impact on the efficiency. Increasing the number of LEDs can allow shorter distances, however increasing the number of LEDs can allow shorter distances with good uniformity and efficiency, but typically at the cost of more power consumption.

In some cases, cavities 628 are configured in bottom case 520 to channel light and contribute to the mixing and uniformity as well as guide light to the edge of keyboard 500. The light emanating from the edge of bottom case 520 is different from conventional keyboards with edge effect lighting both in the technical implementation and the location of where the light exists in keyboard 500, with conventional keyboards having edge lighting at 5 mm off or higher due to the location of the light producing infrastructure being higher up in the keyboard (e.g., at least above their bottom case), and keyboards using the inventive concepts described herein typically at 1-2 mm because the bottom case is so close to, and in some cases in contact with, the underlying surface. Thus, surface lighting effects and efficiency can be substantially improved over conventional designs due in part to the shorter distance between the edge of the light guide (edge of bottom case 520) and the underlying surface. For the same reason, keyboards using the lighting systems described herein can be low profile keyboards with 2 mm or more reduction in keyboard height as compared to conventional keyboards with different edge lighting systems.

Bottom case 520 can be comprised in whole or in part of a transparent thermoplastic polymer, which allows light from the LEDs embedded therein to pass through the bottom case, as described above. Some typical thermoplastic polymers that can be used include polycarbonates (PC) or acrylonitrile butadiene styrene (ABS), although any suitable compound or material can be used, and preferably those with good light transmittance properties (e.g., sufficiently transparent) that can provide good structural support for the keyboard. In some cases, the bottom case can be doped with a diffuser (e.g., $SiO_2$ preferably less than 0.1%) or other dopant to make some or all of bottom case less transparent (preferably not in areas that reduce light transmittance in the path of the LED light) so the inner structures of keyboard 500 are less visible from users viewing the outside of keyboard 500.

Figure 6:
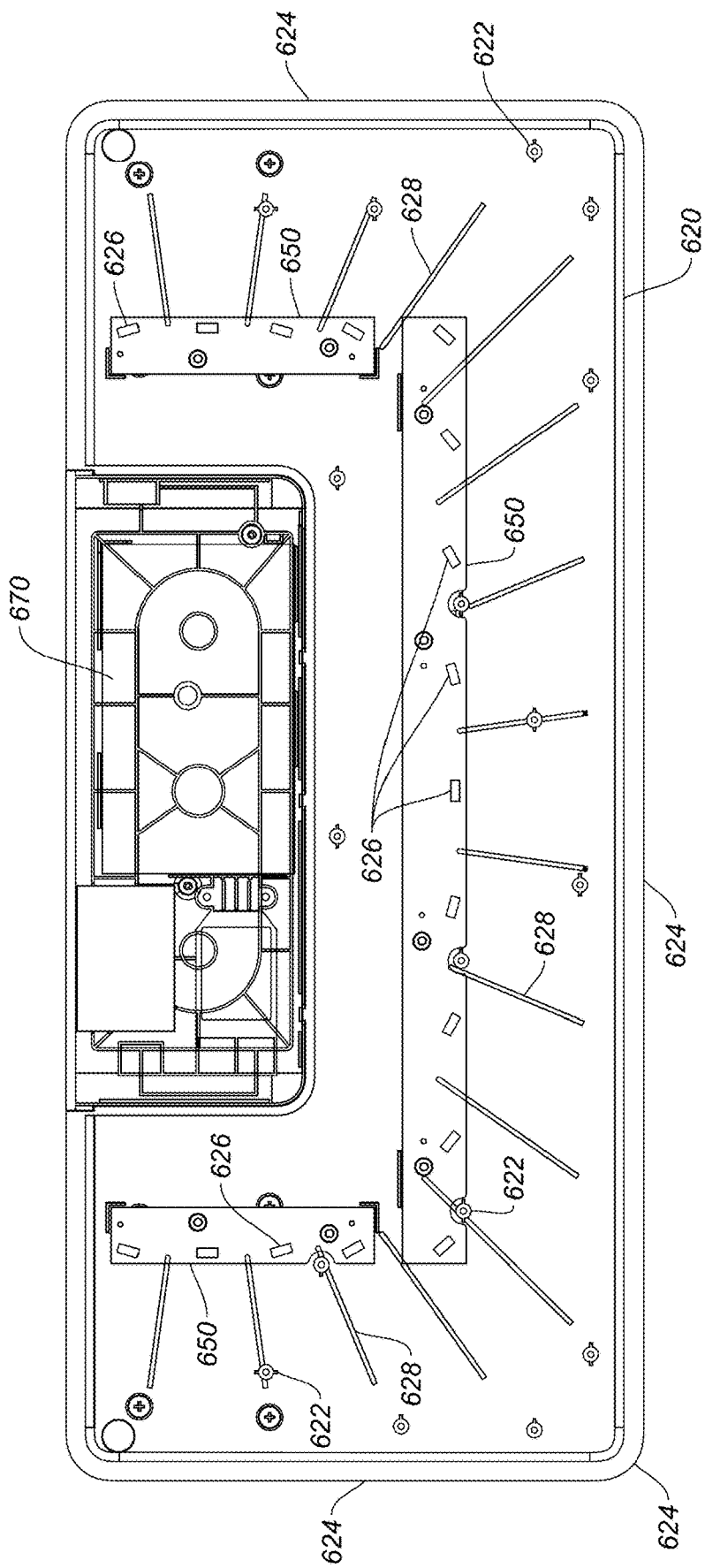
FIG. 6 shows aspects of a bottom case for a keyboard with a surface lighting system, according to certain embodiments.
Figure 7:
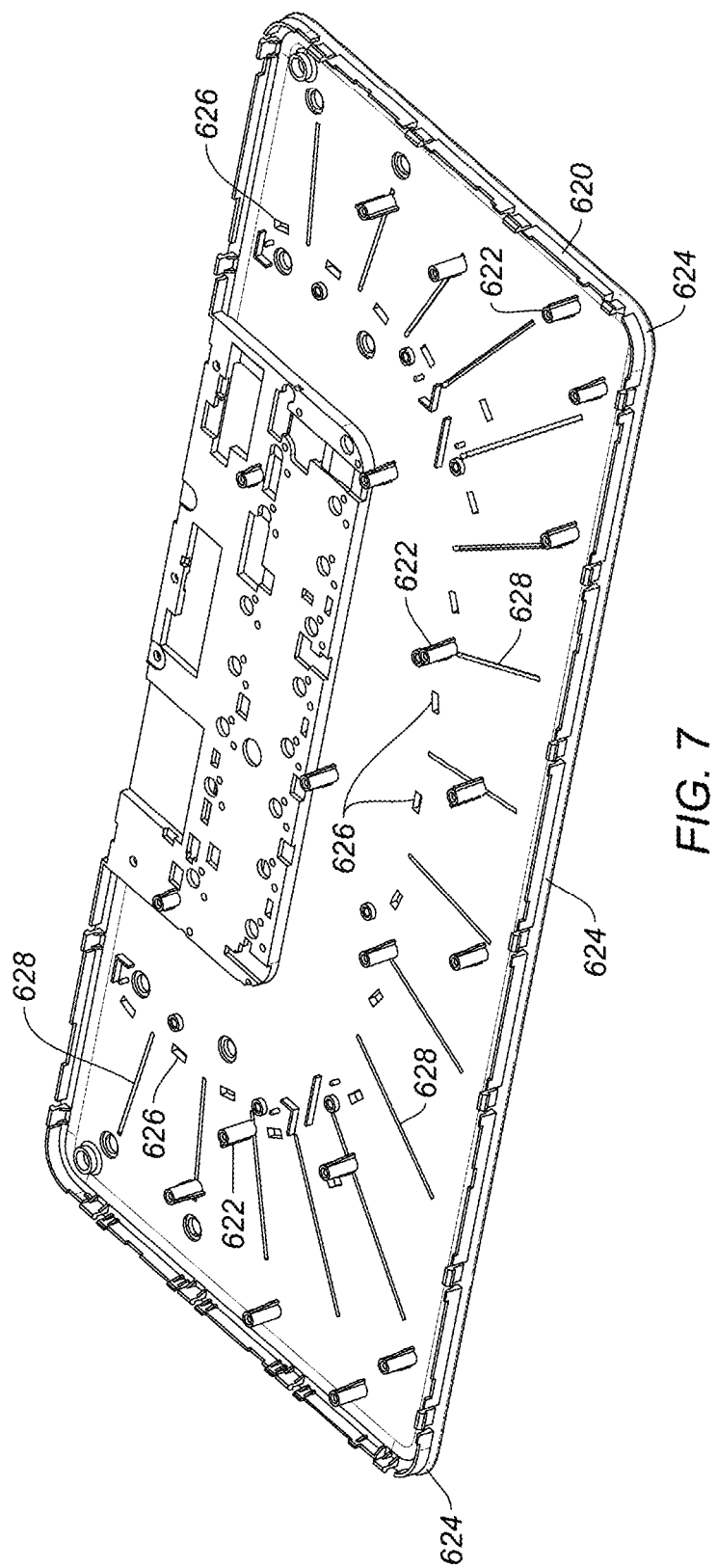
FIG. 7 shows aspects of a bottom case for a keyboard with a surface lighting system, according to certain embodiments.

FIGS. 6 and 7 show aspects of a bottom case 620 for a keyboard with a surface lighting system, according to certain embodiments. Bottom case 620 may be similar to bottom case 520 and 420, as described above. Bottom case 620 includes a plurality of screw bosses 622, a contoured side portion 624, LED recesses 626, LED PCBs 650 (not shown in FIG. 7), and a plurality of cavities 628 that extend from a top of the bottom case to a bottom of the bottom case and extend linearly and radially from a middle portion of the bottom case toward an outer edge of the keyboard. Bottom case 620 may include an area 660 configured to house additional PCBs, harnesses, energy storage devices (e.g., battery 670), or any other keyboard infrastructure, as would be appreciated by one of ordinary skill in the art with the benefit of this disclosure.

There are seventeen LED recesses 626 shown in FIGS. 6 and 7, each configured to house an LED such that the light emitting portion of the LED is embedded within bottom case 620 so that the LED (typically a side-firing LED) emits light directly into transparent bottom case 620 and laterally towards the edges of bottom case 620, as described above. In some embodiments, more or fewer LED recesses and corresponding LEDs may be implemented. The LED recesses 626 may pass from the top side of bottom case 620 to the bottom side of case 620 such that there is a complete through-hole from the top side to the bottom side of bottom case 620. In some embodiments, the LED recesses may only partially pass through bottom case 620 preferably deep enough within bottom case 620 to accommodate an LED to reside within the recess.

Screw bosses 622 are typically integrated with bottom case 620 and may be configured to receive hardware (e.g., screw, pin, tab, etc.) to couple the top case (not shown) to the bottom case forming an outer housing for the keyboard. Screw bosses 622 may be any suitable size and multiple sizes may be used within bottom case 620 based on their application. For example, larger screw bosses 622 may be configured to receive larger screws to securely couple the top case to the bottom case and form the outer housing of the keyboard. In some aspects, smaller screw bosses may be used to secure LED PCBs 650 and/or other PCBs to bottom case 620. One of ordinary skill in the art with the benefit of this disclosure would appreciate the many modifications, variations, and alternative embodiments thereof.

The plurality of cavities 628 can extend from a top of the bottom case to a bottom of the bottom case and extend linearly and radially from a middle portion of the bottom case toward an outer edge of the keyboard, as shown in FIGS. 6 and 7. Each of the plurality of cavities may be an air gap within bottom case 620, which can be manufactured as linear cuts through or partially through bottom case 620 and can be referred to as "cuts." Each of the plurality of cavities may have a uniform thickness but may have a different radial angle and length as compared to other adjacent cavities, as can be seen in FIGS. 6 and 7. As noted above, the cavities are configured to reflect light back into the radial light path towards the edge of the keyboard. In some aspects, the cavities reflect the LED light due, in part, to the index of refraction of air versus the transparent bottom case 620. In preferred embodiments, screw bosses may be positioned in-line with or close to the cavities so that they do not obstruct the light path for the LED light as it traverses the bottom case to the outer edge and toward contoured side portion 624, where the LED light is directed out of the keyboard and onto the surface and/or out of the side of the keyboard.

Figure 8:
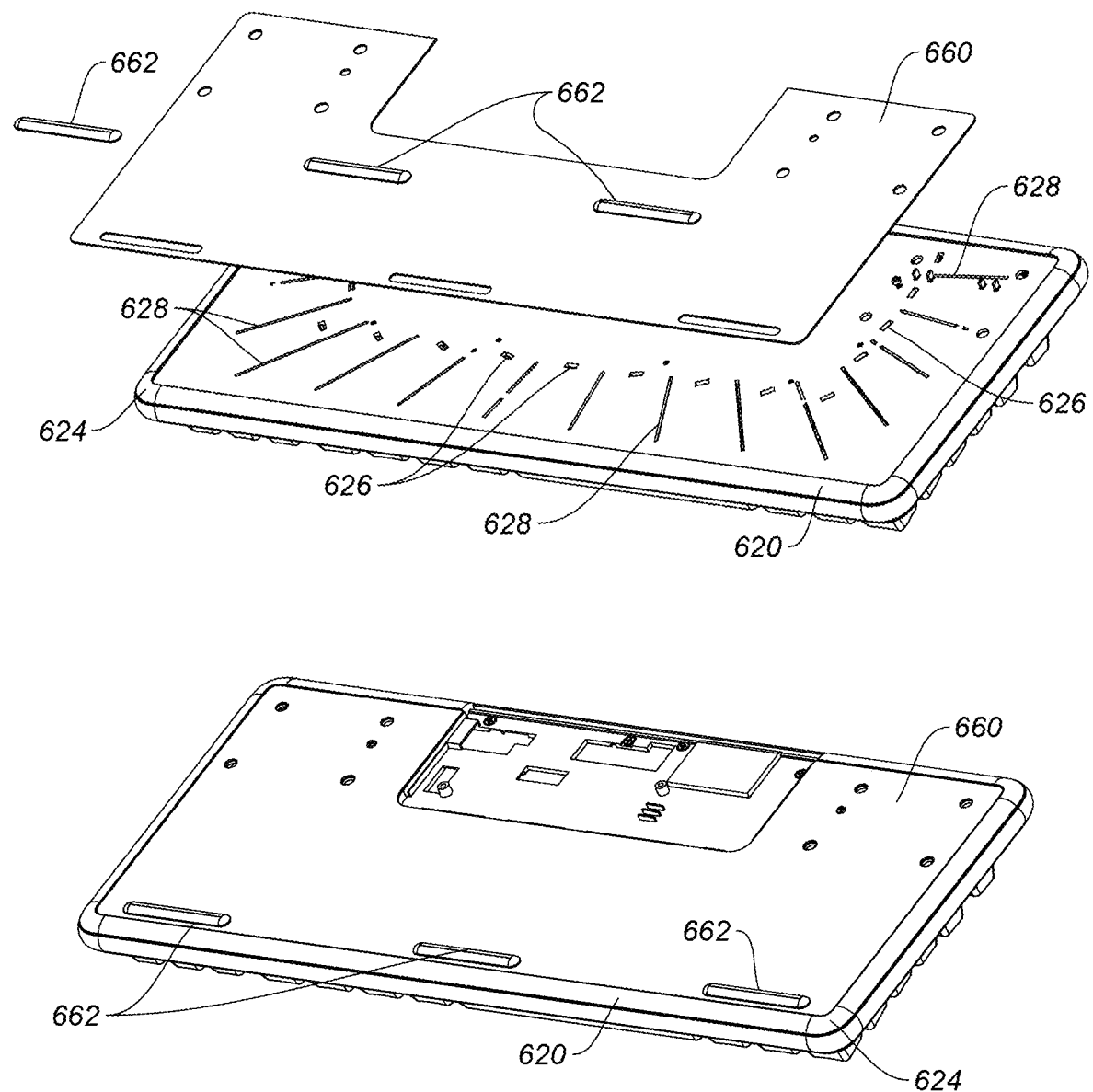
FIG. 8 shows aspects of a surface lighting system for a keyboard, according to certain embodiments.

FIG. 8 shows a bottom layer 660 and feet 662 coupled to a bottom case 620, according to certain embodiments. Bottom layer 660 may include a reflective surface (e.g., Mylar®) on the side contacting bottom case 620 to mitigate light leakage and to allow light to bounce back towards the center of the bottom case, which can increase light transmission efficiency and can contribute to improved light uniformity and color mixing. Some embodiments may not employ a bottom layer and the elements of bottom layer 660, such as feet or a reflective layer may be incorporated directly on the bottom case. One of ordinary skill in the art with the benefit of this disclosure would appreciate the many modifications, variations, and alternative embodiments thereof.

Figure 9A:
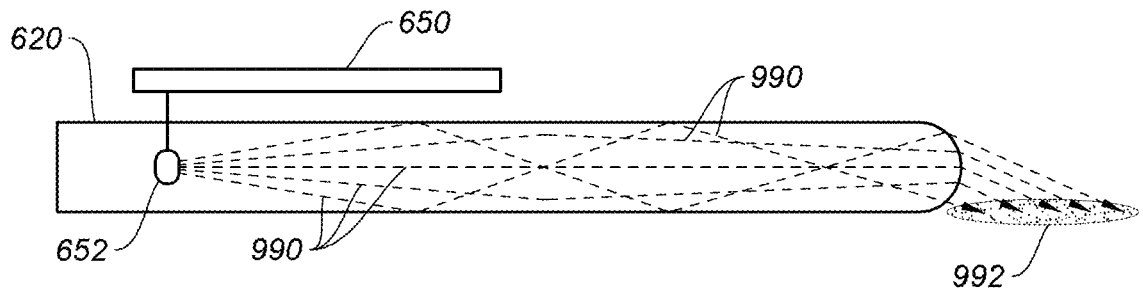
FIGS. 9A and 9B show simplified block diagrams of how light propagates through the bottom case, according to certain embodiments.
Figure 9B:
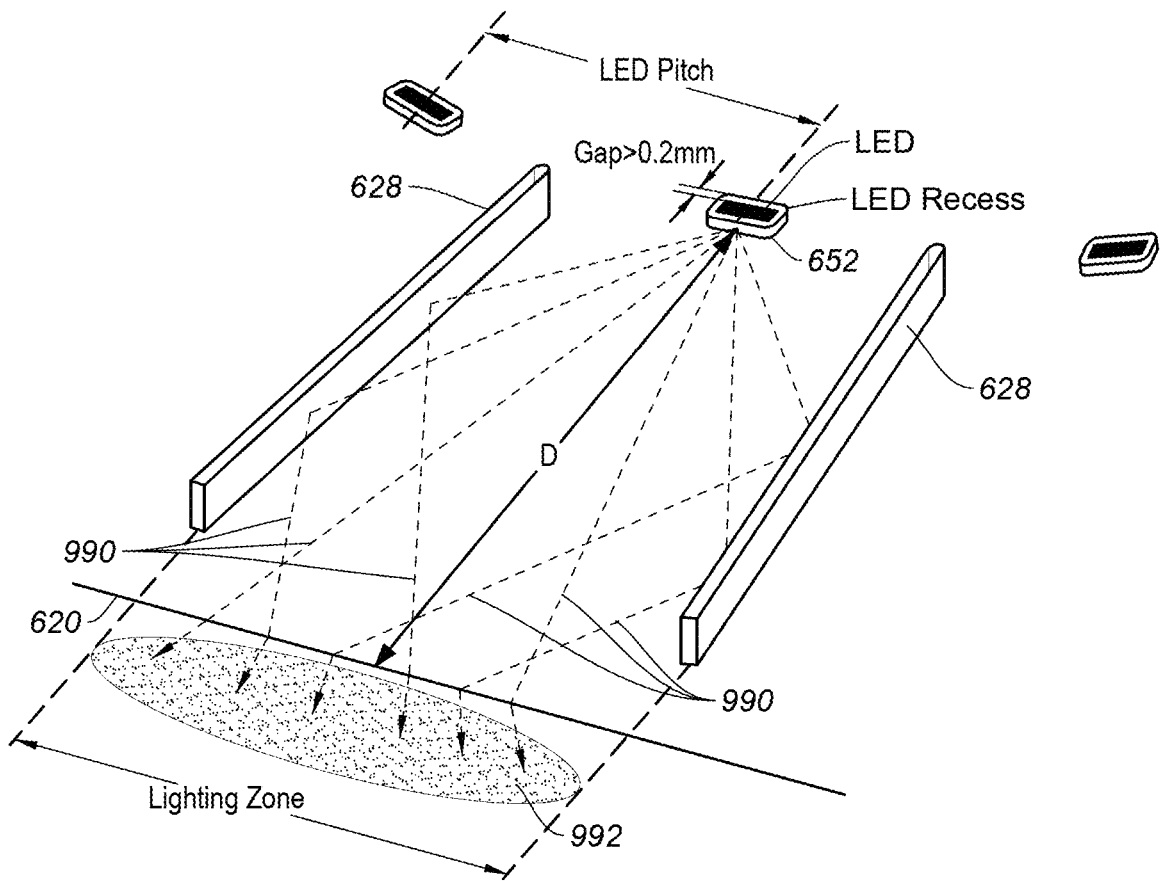

FIGS. 9A and 9B show simplified block diagrams of how light propagates through the bottom case, according to certain embodiments. FIG. 9A shows a block diagram of a side view of bottom case 620 and corresponding elements including LED PCB 650 and LED 652. LED PCB 650 may be coupled to bottom case 620 via a screw boss (not shown) or other element. In some cases, PCB 650 may be coupled to a structure other than bottom case 620. LED 652 may be electrically and physically coupled to LED PCB 650 such that LED 652 protrudes downwards and towards bottom case 620. The operation of LED 652 may be controlled by the one or more processors 210, output control module 260, via control elements on LED PCB 650, or a combination thereof. At least the light emitting portion of LED 652 may be configured to be housed within a corresponding LED recess 626. LED 652 may be a side-firing LED so that light is emitted laterally within transparent bottom case 620 and out towards the edge of bottom case 620, as shown in FIGS. 9A and 9B. In some cases, LED 652 may not be side firing and other elements may be used to direct LED light laterally through bottom case 620 including lenses, reflective surfaces (e.g., mirrors, Mylar® surfaces, etc.), or other light directing structures, as would be appreciated by one of ordinary skill in the art with the benefit of this disclosure.

LED 652 may be configured to emit light laterally, as show in FIGS. 9A and 9B. In FIG. 9A, light 990 is emitted over a volumetric cone of about a 120 degree angle; however, other emission patterns (e.g., flat, focused, multiple lobes, etc.) are possible. For light rays that are directed straight out towards the edge of bottom case 620 at contoured edge portion 624, contoured edge portion 624 can be configured to direct light laterally outwards and/or towards an underlying surface (e.g., surface effect 992) to create side lighting and surface lighting effects (e.g., color patterns, lighting patterns, brightness, etc.), as would be appreciated by one of ordinary skill in the art with the benefit of this disclosure. FIG. 9A also shows certain light rays of light 990 that are directed towards the top or bottom of bottom case 620. These light rays may bounce off of the corresponding top or bottom of bottom case 620 and back into the middle portion of bottom case 620 due to a reflective surface that may be integrated with bottom case 620 or coupled directly to the bottom case. Mylar® is an example of a reflective surface that can be incorporated with bottom case 620.

FIG. 9B shows a top-side perspective view of FIG. 9A, according to certain embodiments. In FIG. 9B, LED 952 emits light 990 laterally towards the edge of bottom case 620 at the contoured edge portion 624, which can be configured to direct light laterally outwards and/or towards an underlying surface (e.g., lighted surface area 992) to create side lighting and surface lighting effects, as described above. In some cases, certain light rays of light 990 may be directed towards one or more of the plurality of cavities 628 that can operate to define a path for light 990 to travel. Light 990 that contacts cavities 628 may bounce off and be redirected back towards the center portion of the bottom case due to the different index of refraction of the air gap defined by the cavities 628 and the index of refraction of bottom case 620. As shown in FIG. 9B, the plurality of cavities 628 are fanned out radially with LEDs positioned in between adjacent cavities 628 to create respective channels for the light 990 from each LED to propagate out to the sides of the keyboard. The cavities 628 and the reflective top and bottom of bottom case 620 help redirect light towards the contoured side portion 624 and laterally outwards from the keyboard and down towards an underlying surface to create a surface effect 992, as described above.

In exemplary embodiments, a keyboard with a lighting system according to certain embodiments may include a top case with a plurality of holes, a plurality of key structures wherein each of the plurality of key structures is configured within a corresponding one of the plurality of holes of the top case, and a bottom case comprised of a transparent material (e.g., transparent thermoplastic polymer). The bottom case can include a plurality of recesses each configured to receive one of a plurality of light emitting diodes (LED) and a plurality of cavities that extend from a top of the bottom case to a bottom of the bottom case and extend linearly and radially from a middle portion of the bottom case toward an outer edge of the keyboard. Each of the plurality of LEDs (e.g., side-firing LEDs with 120 degree emission) can be configured to emit light into the bottom case, which operates as a light guide, where the emitted light is directed radially towards and out of the outer edge of the bottom case, due in part to an emission pattern of the corresponding LED and by adjacent cavities of the plurality of cavities. The bottom case can further include a plurality of screw bosses configured to receive screws that securely couple the top case to the bottom case, wherein the bottom case is coupled to the top case forming an outer housing for the keyboard that encapsulates at least a portion of the plurality of key structures. In some embodiments, the bottom case can be further comprised of 0.025% SiO2. An outer edge of the bottom case may be contoured such that the emitted light is directed out of the bottom case and, when the keyboard is placed on an underlying surface, downward toward the underlying surface that the keyboard is placed upon and creates a surface illumination effect. The plurality of cavities can operate to redirect reflected light radially towards and out of the outer edge of the keyboard, and to increase LED light mixing and uniformity. In certain embodiments, a top or bottom of the bottom case includes a reflective layer that operates to reflect incident light from the plurality of LEDs. The bottom case may further house an energy storage device configured to power the keyboard. The keyboard can further include a first printed circuit board (PCB) electrically coupled to the plurality of key structures and configured to provide structural support for the plurality of key structures, wherein the first PCB is coupled to one or more of the screw bosses of the bottom case, and a set of second PCBs electrically coupled to the plurality of LEDs and configured to provide structural support for the plurality of LEDs, wherein the set of second PCBs are coupled to one or more of the screw bosses of the bottom case.

Some embodiments may utilize at least one network that would be familiar to those skilled in the art for supporting communications using any of a variety of commercially available protocols, such as TCP/IP, UDP, OSI, FTP, UPnP, NFS, CIFS, and the like. The network can be, for example, a local area network, a wide-area network, a virtual private network, the Internet, an intranet, an extranet, a public switched telephone network, an infrared network, a wireless network, and any combination thereof.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a non-transitory computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services or other elements located within at least one working memory device, including an operating system and application programs, such as a client application or browser. It should be appreciated that alternate embodiments may have numerous variations from that described above. For example, customized hardware might also be used and/or particular elements might be implemented in hardware, software (including portable software, such as applets) or both. Further, connections to other computing devices such as network input/output devices may be employed.

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter. The various embodiments illustrated and described are provided merely as examples to illustrate various features of the claims. However, features shown and described with respect to any given embodiment are not necessarily limited to the associated embodiment and may be used or combined with other embodiments that are shown and described. Further, the claims are not intended to be limited by any one example embodiment.

While the present subject matter has been described in detail with respect to specific embodiments thereof, it will be appreciated that those skilled in the art, upon attaining an understanding of the foregoing may readily produce alterations to, variations of, and equivalents to such embodiments. Accordingly, it should be understood that the present disclosure has been presented for purposes of example rather than limitation, and does not preclude inclusion of such modifications, variations, and/or additions to the present subject matter as would be readily apparent to one of ordinary skill in the art. Indeed, the methods and systems described herein may be embodied in a variety of other forms; furthermore, various omissions, substitutions and changes in the form of the methods and systems described herein may be made without departing from the spirit of the present disclosure. The accompanying claims and their equivalents are intended to cover such forms or modifications as would fall within the scope and spirit of the present disclosure.

Although the present disclosure provides certain example embodiments and applications, other embodiments that are apparent to those of ordinary skill in the art, including embodiments which do not provide all of the features and advantages set forth herein, are also within the scope of this disclosure. Accordingly, the scope of the present disclosure is intended to be defined only by reference to the appended claims.

Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provide a result conditioned on one or more inputs. Suitable computing devices include multi-purpose microprocessor-based computer systems accessing stored software that programs or configures the computing system from a general purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

Conditional language used herein, such as, among others, "can," "could," "might," "may," "e.g.," and the like, unless specifically stated otherwise, or otherwise understood within the context as used, is generally intended to convey that certain examples include, while other examples do not include, certain features, elements, and/or steps. Thus, such conditional language is not generally intended to imply that features, elements and/or steps are in any way required for one or more examples or that one or more examples necessarily include logic for deciding, with or without author input or prompting, whether these features, elements and/or steps are included or are to be performed in any particular example.

The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list. The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Similarly, the use of "based at least in part on" is meant to be open and inclusive, in that a process, step, calculation, or other action "based at least in part on" one or more recited conditions or values may, in practice, be based on additional conditions or values beyond those recited. Headings, lists, and numbering included herein are for ease of explanation only and are not meant to be limiting.

The various features and processes described above may be used independently of one another, or may be combined in various ways. All possible combinations and sub-combinations are intended to fall within the scope of the present disclosure. In addition, certain method or process blocks may be omitted in some embodiments. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed examples. Similarly, the example systems and components described herein may be configured differently than described. For example, elements may be added to, removed from, or rearranged compared to the disclosed examples.

What is claimed is:

1. An apparatus comprising:
   a bottom case for a keyboard comprised of a transparent material and including:
   a plurality of cavities that extend from a top of the bottom case to a bottom of the bottom case and extend linearly and radially toward an outer edge of the keyboard,
   wherein each of the plurality of cavities are operable to guide light within the transparent material from a light source from a portion of the bottom case to the outer edge of the keyboard, and
   wherein the bottom case is configured to be the bottom-most structural layer of the keyboard.

2. The apparatus of claim 1 wherein each of the plurality of cavities has a corresponding light source positioned between itself and an adjacent cavity of the plurality of cavities, and each corresponding light source is a side-firing LED.

3. The apparatus of claim 1 wherein the bottom case is comprised of a transparent thermoplastic polymer.

4. The apparatus of claim 1 wherein the bottom case is further comprised of 0.025% $SiO_2$.

5. The apparatus of claim 1 wherein an outer edge of the bottom case is contoured such that light guided to the outer edge of the keyboard is directed out of the bottom case and, when the keyboard is placed on an underlying surface, downward toward the underlying surface that the keyboard is placed upon and creates a surface illumination effect.

6. A keyboard comprising:
   a top case including a plurality of holes;
   a plurality of key structures wherein each of the plurality of key structures is configured within a corresponding one of the plurality of holes of the top case; and
   a bottom case comprised of a transparent material and including:
   a plurality of recesses each configured to receive one of a plurality of light emitting diodes (LED);
   a plurality of cavities that extend from a top of the bottom case to a bottom of the bottom case and extend linearly and radially from a portion of the bottom case toward an outer edge of the keyboard,
   wherein each of the plurality of LEDs is configured to emit light into the bottom case, which operates as a light guide, where the emitted light is directed radially towards and out of the outer edge of the bottom case, due in part to an emission pattern of the corresponding LED and by adjacent cavities of the plurality of cavities; and
   wherein the bottom case is coupled to the top case forming an outer housing for the keyboard that encapsulates at least a portion of the plurality of key structures.

7. The keyboard of claim 6 wherein each of the plurality of LEDs is a side-firing LED.

8. The keyboard of claim 6 wherein the bottom case is comprised of a transparent thermoplastic polymer.

9. The keyboard of claim 8 wherein the bottom case is further comprised of 0.025% $SiO_2$.

10. The keyboard of claim 6 wherein an outer edge of the bottom case is contoured such that the emitted light is directed out of the bottom case and, when the keyboard is placed on an underlying surface, downward toward the underlying surface that the keyboard is placed upon and creates a surface illumination effect.

11. The keyboard of claim 6 wherein the plurality of cavities operate to redirect reflected light radially towards and out of the outer edge of the keyboard, and to increase LED light mixing and uniformity.

12. The keyboard of claim 6 wherein a top or bottom of the bottom case includes a reflective layer that operates to reflect incident light from the plurality of LEDs.

13. The keyboard of claim 6 wherein the bottom case further houses an energy storage device configured to power the keyboard.

14. The keyboard of claim 6 further comprising a first printed circuit board (PCB) electrically coupled to the plurality of key structures and configured to provide structural support for the plurality of key structures, wherein the first PCB is coupled to the bottom case.

15. The keyboard of claim 14 further comprising a set of second PCBs electrically coupled to the plurality of LEDs and configured to provide structural support for the plurality of LEDs, wherein the set of second PCBs are coupled to the bottom case.

* * * * *